(12) United States Patent
Natoli et al.

(10) Patent No.: US 12,574,340 B2
(45) Date of Patent: *Mar. 10, 2026

(54) SYSTEM AND METHOD FOR AUTOMATIC SHORT MESSAGE GENERATION

(71) Applicant: Klaviyo, Inc., Boston, MA (US)

(72) Inventors: Charles T. Natoli, San Francisco, CA (US); Devin Patel, Boston, MA (US); Sofiane Hadji, Boston, MA (US); Gal Gila Korcia, Cambridge, MA (US); Nick Vessella, Rockland, MA (US); Robert Huselid, Stamford, CT (US); Andrew Piliero, Redwood City, CA (US); Tristan Mills, Cambridge, MA (US); Harsh Mehta, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 149 days.

This patent is subject to a terminal disclaimer.

(21) Appl. No.: 18/534,809

(22) Filed: Dec. 11, 2023

(65) Prior Publication Data

US 2024/0250922 A1 Jul. 25, 2024

Related U.S. Application Data

(63) Continuation of application No. 18/099,133, filed on Jan. 19, 2023, now Pat. No. 11,909,699.

(51) Int. Cl.
H04L 51/02 (2022.01)
G06Q 30/0201 (2023.01)
(Continued)

(52) U.S. Cl.
CPC ......... H04L 51/02 (2013.01); G06Q 30/0201 (2013.01); H04L 51/063 (2013.01); H04L 51/212 (2022.05)

(58) Field of Classification Search
CPC .............................. H04L 51/02; H04L 51/212
See application file for complete search history.

(56) References Cited

U.S. PATENT DOCUMENTS

| | | | |
|---|---|---|---|
| 6,424,997 B1 | 7/2002 | Buskirk | |
| 6,549,957 B1 * | 4/2003 | Hanson | ................. H04L 51/214 |
| | | | 710/5 |

(Continued)

FOREIGN PATENT DOCUMENTS

| | | |
|---|---|---|
| WO | 0184383 A2 | 11/2001 |
| WO | 2008094712 | 8/2008 |
| WO | 2016028831 A1 | 2/2016 |

OTHER PUBLICATIONS

11 Best Drag and Drop Word Press Page Builder Plugins, by Anna Fitzgerald, Nov. 13, 2020, pp. 1-21; https://blog.hubspot.com/website/top-5-free-drag-and-drop-wordpress-page-builder-plugins (Year: 2020).

(Continued)

*Primary Examiner* — Shirley X Zhang
(74) *Attorney, Agent, or Firm* — Brian R. Short

(57) ABSTRACT

Apparatuses, methods, and systems for generating short messages for electronic messages of electronic marketing messages. One method includes receiving, by a server, information related to the electronic marketing message, receiving, by the server, a plurality of N short messages (text) generated based on the received information from a generative text engine model, reducing, by the server, the plurality of N short messages down to M short messages, displaying messages based on the M short messages to a merchant user, identifying merchant actions in response to the displaying of the messages based on the M short messages, and fine-tuning, by the server, the generative text engine model based on the identified merchant actions.

18 Claims, 7 Drawing Sheets

(51) Int. Cl.
     H04L 51/063          (2022.01)
     H04L 51/212          (2022.01)

(56)                    References Cited

U.S. PATENT DOCUMENTS

| | | | |
|---|---|---|---|
| 7,213,202 B1 | 5/2007 | Kagle | |
| 7,257,772 B1 | 8/2007 | Jones et al. | |
| 7,287,218 B1 | 10/2007 | Knotz et al. | |
| 7,533,090 B2 | 5/2009 | Agarwal et al. | |
| 7,752,607 B2 | 7/2010 | Larab et al. | |
| 7,845,950 B2 | 12/2010 | Driscoll et al. | |
| 7,975,000 B2 | 7/2011 | Dixon et al. | |
| 7,975,223 B2 | 7/2011 | Plumley et al. | |
| 8,250,470 B2 | 8/2012 | Takashima | |
| 8,341,224 B2 | 12/2012 | Kasetty et al. | |
| 8,434,002 B1 | 4/2013 | Shah et al. | |
| 8,484,156 B2 | 7/2013 | Hancsarik et al. | |
| 8,751,327 B2 | 6/2014 | Park et al. | |
| 9,237,233 B2 | 1/2016 | Soundar | |
| 9,430,454 B2 | 8/2016 | Newman et al. | |
| 9,892,420 B2 | 2/2018 | Sterns et al. | |
| 10,248,657 B2 | 4/2019 | Prahlad et al. | |
| 10,331,775 B2 | 6/2019 | Ryan et al. | |
| 10,614,501 B2 | 4/2020 | Fredrich et al. | |
| 10,701,005 B2 | 6/2020 | Nutt et al. | |
| 10,728,200 B2 | 7/2020 | Miller et al. | |
| 10,817,663 B2 | 10/2020 | Weald et al. | |
| 11,070,511 B2 | 7/2021 | O'Brien et al. | |
| 11,144,198 B2 | 10/2021 | Chen et al. | |
| 11,144,980 B2 | 10/2021 | Fredrich et al. | |
| 11,265,271 B2 | 3/2022 | Tetreault et al. | |
| 11,516,158 B1* | 11/2022 | Luzhnica | G06F 40/35 |
| 11,880,650 B1 | 1/2024 | Li et al. | |
| 12,299,718 B1 | 5/2025 | Johnson et al. | |
| 2005/0273705 A1 | 12/2005 | McCain | |
| 2006/0225040 A1 | 10/2006 | Waddington | |
| 2008/0178073 A1 | 7/2008 | Gao et al. | |
| 2008/0189156 A1 | 8/2008 | Voda et al. | |
| 2008/0249856 A1* | 10/2008 | Angell | G06Q 30/0271 |
| | | | 705/14.67 |
| 2009/0006936 A1 | 1/2009 | Parker et al. | |
| 2009/0125518 A1 | 5/2009 | Bailor et al. | |
| 2010/0281074 A1 | 11/2010 | Bailor et al. | |
| 2011/0078246 A1 | 3/2011 | Dittmer-Roche | |
| 2012/0042239 A1 | 2/2012 | O'Brien | |
| 2012/0233554 A1 | 9/2012 | Vagell et al. | |
| 2012/0294514 A1 | 11/2012 | Saunders et al. | |
| 2013/0124956 A1 | 5/2013 | Hatfield et al. | |
| 2014/0033101 A1 | 1/2014 | Rein et al. | |
| 2014/0074591 A1* | 3/2014 | Allen | G06Q 30/0244 |
| | | | 705/14.43 |
| 2014/0278747 A1 | 9/2014 | Gumm | |
| 2014/0282125 A1 | 9/2014 | Duneau | |
| 2015/0363796 A1 | 12/2015 | Lehman et al. | |
| 2016/0070717 A1 | 3/2016 | Bergner et al. | |
| 2016/0117717 A1 | 4/2016 | Moreau et al. | |
| 2016/0132472 A1 | 5/2016 | Campbell et al. | |
| 2016/0189198 A1* | 6/2016 | Mckenzie | G06Q 30/0277 |
| | | | 705/14.41 |
| 2016/0241502 A1 | 8/2016 | Georgiou | |
| 2017/0019697 A1 | 1/2017 | Hundemer | |
| 2017/0091809 A1 | 3/2017 | Liu et al. | |
| 2018/0027085 A1 | 1/2018 | Stanislaw et al. | |
| 2018/0081868 A1 | 3/2018 | Willcock et al. | |
| 2019/0043106 A1 | 2/2019 | Talmor et al. | |
| 2019/0121827 A1 | 4/2019 | Boswell et al. | |
| 2019/0197092 A1 | 6/2019 | Thiesen et al. | |
| 2019/0228063 A1 | 7/2019 | El-Sherif et al. | |
| 2020/0013092 A1 | 1/2020 | Liu et al. | |
| 2020/0065857 A1* | 2/2020 | Lagi | G06Q 30/0254 |
| 2020/0356624 A1 | 11/2020 | Cai et al. | |
| 2021/0157974 A1* | 5/2021 | Xie | H04L 51/52 |
| 2021/0217047 A1* | 7/2021 | Zhang | G06Q 30/0239 |
| 2021/0224858 A1* | 7/2021 | Khoury | G06Q 30/0276 |
| 2021/0389962 A1 | 12/2021 | Li | |
| 2022/0036311 A1 | 2/2022 | Didrickson et al. | |
| 2022/0113853 A1 | 4/2022 | Nostrini et al. | |
| 2022/0188740 A1 | 6/2022 | Nazarali et al. | |
| 2022/0335448 A1 | 10/2022 | Garg et al. | |
| 2022/0414686 A1 | 12/2022 | Lawson et al. | |
| 2023/0004711 A1 | 1/2023 | Bhatnagar et al. | |
| 2023/0144617 A1 | 5/2023 | Karidi et al. | |
| 2023/0298368 A1 | 9/2023 | Berger et al. | |
| 2024/0144319 A1 | 5/2024 | Saidi et al. | |
| 2024/0160902 A1* | 5/2024 | Padgett | G06N 3/0895 |
| 2024/0250922 A1 | 7/2024 | Natoli et al. | |
| 2024/0273282 A1* | 8/2024 | Muralidharan | G06F 40/30 |
| 2024/0428291 A1 | 12/2024 | Jain et al. | |
| 2025/0111237 A1* | 4/2025 | Krishnamurthy | G06N 3/091 |
| 2025/0131020 A1* | 4/2025 | Gupta | G06N 3/045 |
| 2025/0323888 A1 | 10/2025 | Natoli et al. | |

OTHER PUBLICATIONS

Lindholm (A 3-way Merging Algorithm for Synchronizing Ordered Trees-the 3DM merging and differencing tool for XML, published Sep. 2001, pp. 1-205) (Year: 2001).

Lindholm (A Three-way Merge for XML Documents, published Oct. 2004, pp. 1-10) (Year: 2004).

Lindholm (XML Three-way Merge as a Reconciliation Engine for Mobile Data, published Sep. 2003, pp. 1-5) (Year: 2003).

P. Ghavare and P. Ahire, "Big Data Classification of Users Navigation and Behavior Using Web Server Logs," 2018 Fourth International Conference on Computing Communication Control and Automation (ICCUBEA), Pune, India, 2018, pp. 1-6 (Year: 2018).

P. He, X. Wen and W. Zheng, "A Novel Method for Filtering Group Sending Short Message Spam," 2008 International Conference on Convergence and Hybrid Information Technology, Daejeon, Korea (South), 2008, pp. 60-65 (Year: 2008).

S. Berger, R. Kjeldsen, C. Narayanaswami, C. Pinhanez, M. Podlaseck and M. Raghunath, "Using Symbiotic Displays to View Sensitive Information in Public," Third IEEE International Conference on Pervasive Computing and Communications, Kauai, HI, USA, 2005, pp. 139-148 (Year: 2005).

WordPress Editor: Working With Blocks »Blocks, Jan. 1, 2021, pp. 1-6; https://wordpress.com/supporUwordpress-editor/blocks/ (Year: 2021).

Y.-S. Kim and S.-S. Kim, "Grant Model for Message Detour in Electronic Business System," Future Generation Communication and Networking (FGCN 2007), Jeju, Korea (South), 2007, pp. 68-73 (Year: 2007).

* cited by examiner

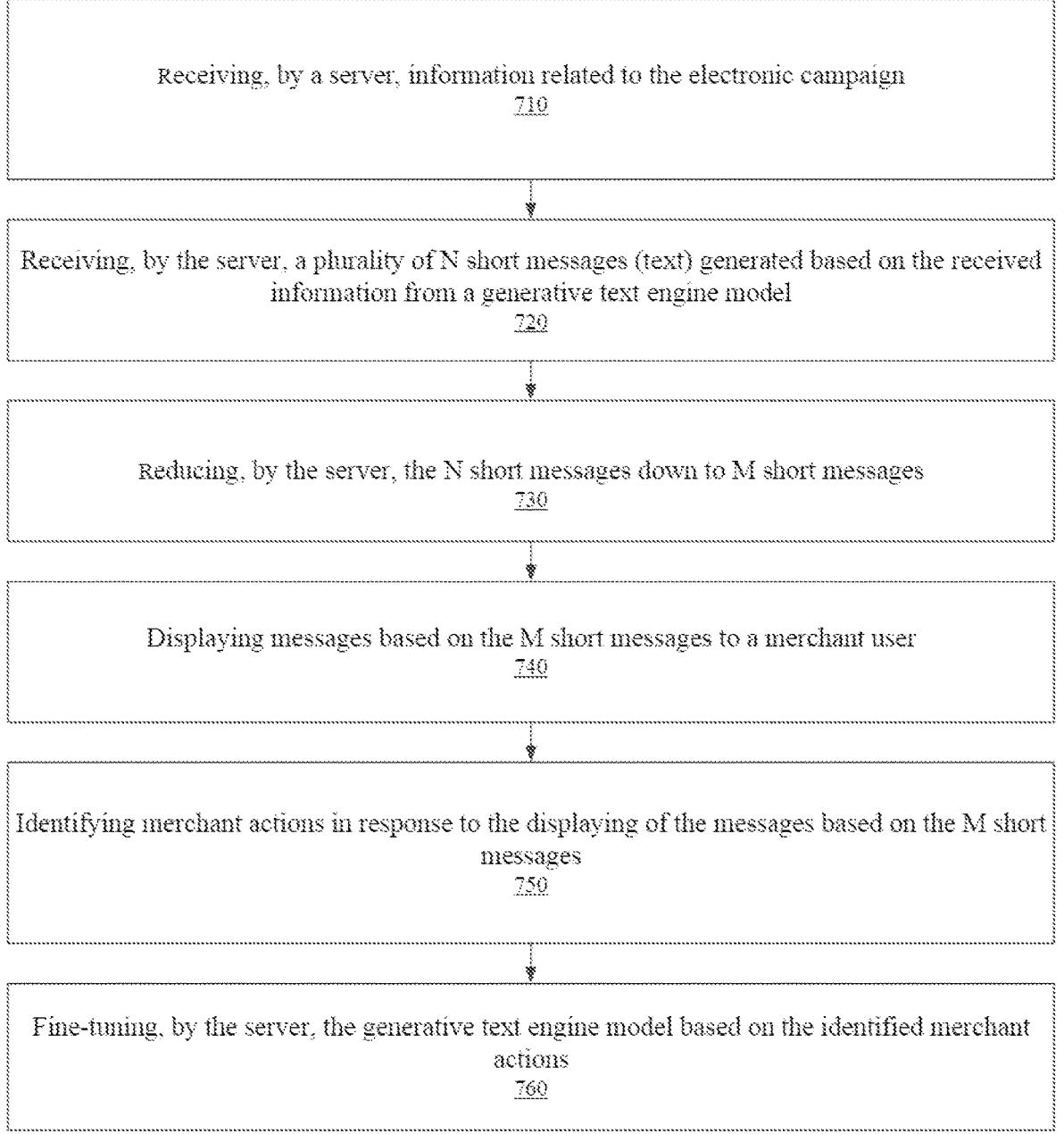

Receiving, by a server, information related to the electronic campaign
710

Receiving, by the server, a plurality of N short messages (text) generated based on the received information from a generative text engine model
720

Reducing, by the server, the N short messages down to M short messages
730

Displaying messages based on the M short messages to a merchant user
740

Identifying merchant actions in response to the displaying of the messages based on the M short messages
750

Fine-tuning, by the server, the generative text engine model based on the identified merchant actions
760

*FIG. 7*

SYSTEM AND METHOD FOR AUTOMATIC SHORT MESSAGE GENERATION

RELATED PATENT APPLICATIONS

This patent application is a continuation of U.S. patent application Ser. No. 18/099,133, filed Jan. 19, 2023, which is herein incorporated by reference.

FIELD OF THE DESCRIBED EMBODIMENTS

The described embodiments relate generally to intelligent electronic message management. More particularly, the described embodiments relate to systems, methods, and apparatuses for automatic generation of the short messages.

BACKGROUND

Merchants frequently send electronic messages to current and prospective customers to generate sales of products or services. The content of the electronic messages can influence the success of the electronic messages.

It is desirable to have methods, apparatuses, and systems for automatic generation of the short messages.

SUMMARY

An embodiment includes a computer-implemented method for generating text for short messages for electronic marketing messaging. The method includes receiving, by a server, information related to the electronic marketing message, receiving, by the server, a plurality of N short messages generated based on the received information from a generative text engine model, reducing, by the server, the plurality of N short messages down to M short messages, displaying messages based on the M short messages to a merchant user, identifying merchant actions in response to the displaying of the messages based on the M short messages, and fine-tuning, by the server, the generative text engine model based on the identified merchant actions.

Another embodiment includes a system for generating text for short messages for electronic mobile messaging of an electronic marketing message. The system includes a merchant server and a management server electronically connected to the merchant server through a network. The management server is configured to receive information related to the electronic marketing message from a merchant user of the merchant server, receive a plurality of N short messages generated based on the received information from a generative text engine model, reduce the N short messages down to M short messages, display messages based on the M short messages to a merchant user, identify merchant actions in response to the displaying of the messages based on the M short messages, and fine-tune the generative text engine model based on the identified merchant actions.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 is a flow chart that includes steps of a method for automatic short messages generation for electronic messages of an electronic marketing message of a merchant, according to another embodiment.

DETAILED DESCRIPTION

The embodiments described include methods, apparatuses, and systems for generating and improving short messages of electronic marketing messages. The generating of the improved short messages saves time for a merchant generating the electronic marketing messages. Additionally, the improved short messages result in better performance of the electronic marketing messages. For an embodiment, the electronic marketing messages are included within an electronic campaign of the merchant that may include many electronic marketing messages. For at least some other embodiments, the electronic marketing messages are generated to be sent in response to some action, such as, an abandoned shopping cart notification, a new subscriber (customer) welcome, and/or a one-time message send.

Figure 1:
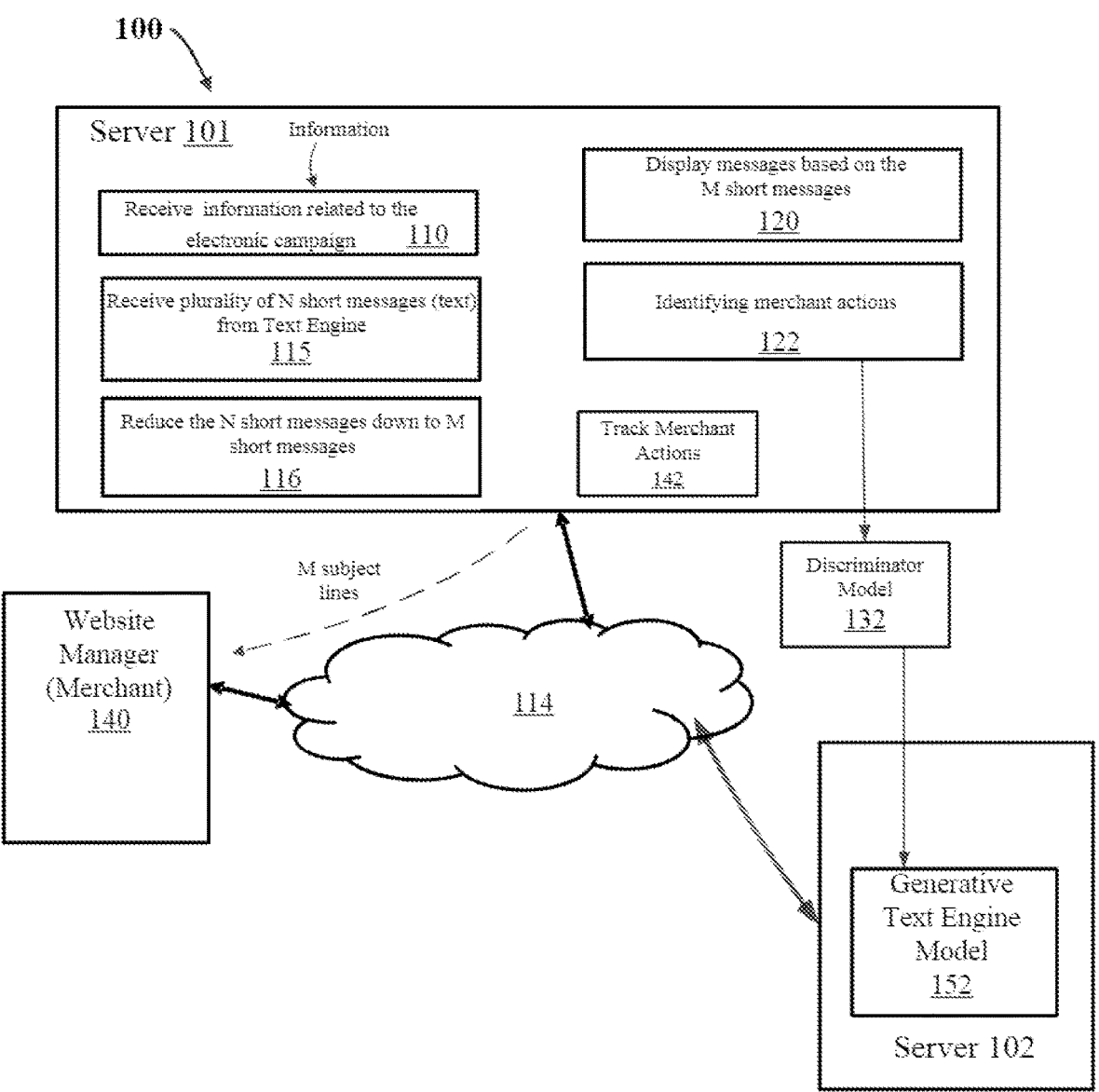
FIG. 1 shows a system for automatic short messages generation for electronic messages of an electronic marketing message of a merchant, according to an embodiment.

FIG. 1 shows a system 100 for automatic short messages generation for electronic messages of an electronic marketing message of a merchant, according to an embodiment. The system 100 includes a server 101 that is connected through an electronic network 114 to at least a merchant server 140. For an embodiment, the merchant server 140 manages a merchant website. It is to be understood that the term "merchant" is being used liberally. That is, a merchant includes any type of business owner. For example, a merchant can include, for example, a teacher, a doctor, a restaurant owner, etc. Further, it is to be understood that at least some embodiments for generating short messages for electronic messages of electronic marketing messages are implemented at the server 101 which is accessed by the merchant on a client side of the server 101. Specifically, for an embodiment, the generation of the short messages for electronic messages of electronic marketing messages are performed by a UI (user interface) of the server 101.

For an embodiment, the server 101 receives 110 information related to the electronic marketing message. For an embodiment, the electronic marketing message provides a means for the merchant to market product and/or services of the merchant. The information includes, for example, a marketing message type, a name, product, promotion, and/or brand name and/or description. Further, for at least some embodiments, the information further includes data on prior marketing message information and activity undertaken by the merchant on the server 101. The server 101 may have this prior marketing message information or may have access to the prior marketing message information.

For an embodiment, the server 101 further operates to preprocess the received information. For at least some embodiment, the preprocessing includes, for example, employing formatting checks, removing electronic marketing messages that include keywords or text styles that could impact the performance of the text generator. The performance impact can be related to customer responses to the messages. Additionally, or alternatively, the performance impact can be related to a likelihood of mobile carriers to accidentally identify non-spam messages as spam. Further, as will be described, for an embodiment, content of short messages generated for a merchant can be personalized by personalizing the information related to the electronic marketing message before generating the N short messages.

For an embodiment, the server 101 provides the preprocessed received information to a generative text engine model 152, and then the server 101 receives (115) a plurality of N short messages generated based on the preprocessed received information from the generative text engine model 152. For an embodiment, the generative text engine model 152 returns text based on a given text prompt, attempting to match a pattern provided to it. For an embodiment, the generative text engine model is built on the AI (artificial intelligence) technology that is trained on large amounts of sample text such that with appropriate guidance, the generative text engine model 152 is capable of generating new text in human-readable sentences having a communication style typical of SMS marketing. For at least some embodiments, the generative text engine model 152 is trained further using tracked merchant and/or customer action data to improve the performance of the generative text engine model 152.

Figure 3:
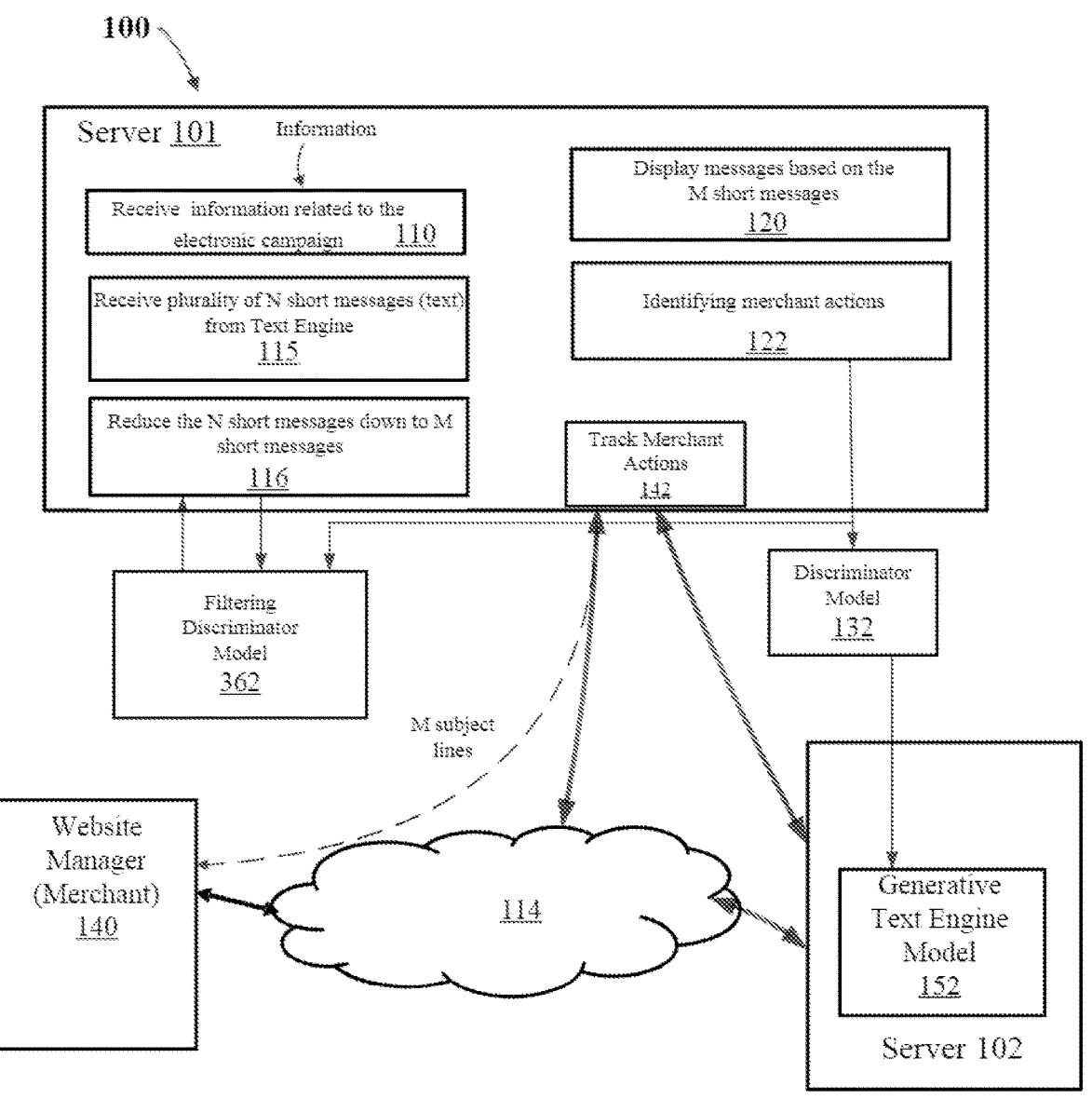
FIG. 3 shows another system for automatic short messages generation for electronic messages of an electronic marketing message of a merchant, according to another embodiment.

For an embodiment, the server 101 operates to reduce (116) the N short messages down to M short messages. As will be described, the reduction of the N short messages down to M short messages can be facilitated by a discriminator model as shown in FIG. 3, and/or the reduction can be facilitated by other means of filtering. The number of N short messages can be reduced (116) to M short messages based on various factors, which can be based on, for example, performing formatting, length, and content checks of the short messages N short messages. It is to be understood that the term "discriminator model" is meant to be a model to rank N messages from best to worst. This model is used to filter N short messages down to M short messages.

For at least some embodiments, messages based on the M short messages are displayed (120) to a merchant user at the merchant server 140. The messages displayed to the merchant may not be exactly the M short messages, but rather, messages derived from or inspired by the M short messages. For at least some embodiments, textual options are provided to the merchant that the merchant can then use as creative inspiration, whether that be the merchant using the provided text directly, editing the text, or using pieces of multiple messages, etc. For an embodiment, a fine-tune enhancer is provided that can be used to adjust the content to include a brand tone of the short messages. For example, for an embodiment, a "slider" is displayed to the merchant that allows the merchant to adjust the tone of one or more of the short messages, between, for example, between playful and serious. Further, at least some embodiments include a brand tone adjustment. For an embodiment, the brand tone adjustment is independent of the slider. For an embodiment, the brand tone adjustment is combined with the sliders to pick an initial tone content of the short messages before allowing the merchant to adjust.

Tracking Merchant Actions

For an embodiment, the server 101 additionally tracks merchant actions 142 based on the messages based on the M short messages displayed to the merchant of the merchant server 140. For at least some embodiments, the tracking of the merchant actions 142 includes tracking the merchant selecting a displayed short message of the M displayed short messages. Clicking the displayed short message indicates an interest by the merchant in the selected short message and indicates a level of value of the selected short message. For an embodiment, tracking of the merchant includes tracking the merchant modifying the short message, and submitting a final revised short message. For an embodiment, tracking of the merchant includes identifying differences between the short messages displayed to the merchant user and the short message(s) sent by the merchant user to customers of the merchant user. Modifying a selected short message provides a level of value of the modified and submitted short message. For an embodiment, tracking of the merchant includes tracking future merchant copy (merchant copy is content written to promote or sell a product or service or to persuade readers to take a certain action. Marketing (merchant) copy is a useful tool that educates customers, provides resources and details contact information to help businesses increase awareness of their products and services) to identify if any of the M messages were used as tonal or stylistic inspiration in future communications. For an embodiment, tracking of the merchant actions includes tracking the merchant interacting with the short message generation system to allow more creative copy from merchant users regardless of whether specific verbatim phrases are used in future communications. For an embodiment, tracking the actions of the merchant includes tracking messages sent by the merchant in any channel supported by the system including, for example, email, SMS, send push notifications, and others.

For an embodiment, a discriminator model 132 operates to assign a quality rating for each of the M short messages based on the identified (tracked) merchant actions (122). For an embodiment, the discriminator model 132 is provided with examples of short messages and whether or not a merchant clicked on, engaged with, or is inspired from (such as writing copy that is similar to), or performed some other action showing interest in a generated short message. This allows the discriminator model 132 to predict whether or not a merchant will find a short message that the generator comes up with to be of high-quality and based on the discriminator's predicted probability that the merchant will approve the short message, the X short messages with the highest X "quality ratings" can be chosen and then those X short messages can be shown to the user (merchant), since they're the "best" of the group of short messages. For an embodiment, the worst performing short messages can also be used by the discriminator model 132.

For an embodiment, different tracked merchant actions suggest a different level of quality of each of the short messages. Accordingly, different specific actions, and/or combinations of actions performed by the merchant on the displayed M short messages can yield a different ranking of the short messages.

For an embodiment, the discriminator model 132 is trained on historically tracked merchant actions on previously generated short messages, wherein the historical merchant actions include selection, editing, and actual use of a short message. For an embodiment, the trained historical model is equipped to assign a quality rating to new, previously unseen M short messages after the short messages have been generated, allowing selection of the predicted top-performing short messages to display to the merchant.

An embodiment further includes continuously updating the generative text engine model based on continuously tracked merchant and customer actions.

FIG. 1 shows the generative text engine model 152 operating on a server 102. However, it is to be understood the text engine model 152 can operate on a separate server, such as, server 102, or the text engine model 152 can alternatively operate on the server 101.

Figure 2:
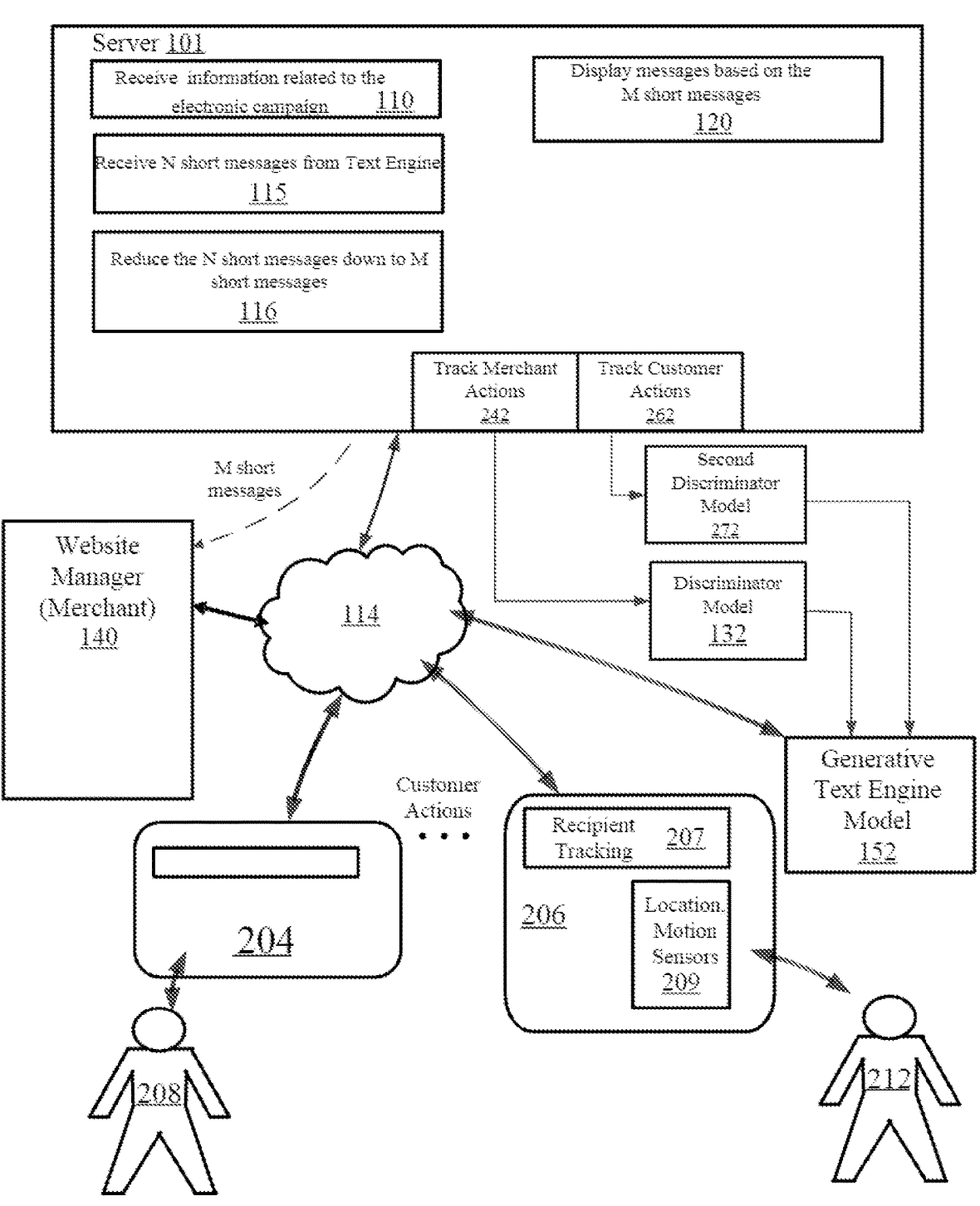
FIG. 2 shows another system for automatic short messages generation for electronic messages of an electronic marketing message of a merchant, according to another embodiment.

FIG. 2 shows another system for automatic short messages generation for electronic messages of an electronic marketing message of a merchant, according to another embodiment. This embodiment further includes tracking actions of customers of the merchant of the merchant server 140. Further, a second discriminator model 272 operates to additionally fine-tune the generative text engine model 152 based on actions of the customers of the merchant.

Tracking Customer Actions

FIG. 2 further includes customer devices 204, 206 of customers 208, 212 that are electronically connected to the server 101 and the merchant server 140 through, for example, the network 114. This embodiment further includes the server 101 tracking customer actions 262 based on the short messages displayed to one or more customers 208, 212 of the merchant of the merchant server 140.

For an embodiment, the tracking of the customers includes tracking online activity and action by the customers. For an embodiment, a customer device (such as, devices 204, 206) alone or in conjunction with the server 101, or the merchant server 140 operates to sense the customer action data. For an embodiment, the sensed and tracked customer action data includes the customer device electronically sensing a customer performing an action or activity in response to the displaying of short messages to the customer that are based on the M generated short messages. For an embodiment, sensing the customer performing an action includes sensing that the customer is selecting or "clicking" a link included within the generated short message(s).

While the described embodiments are directed towards sensing customer action data, it is to be understood that at least some other embodiments can additionally or alternatively include the sensing of other types of data as well. For an embodiment, the sensed data can include merchant server data, such as, web traffic and purchases among message recipients. That is, the sensed customer action data could be replaced with, for example, data of daily total or new visitors on the merchant website.

The customer action data may be tracked (counted) over various possible time periods (such as, by the second, minute, hour, day, week, or month) and may include one or more of customers (208, 212) being active on the website of the merchant server 140, a sent email bouncing, a customer canceled order, a customer starting a checkout, a customer clicking (selecting) an email, a customer opening email, a customer placing order, a customer receiving email, a customer refunding an order, a customer unsubscribing, a customer viewing a product, a customer adding to a list (a list in the marketing automation platform of the server 101 account), and/or a customer adding an item to their cart.

It is to be understood, however, that there are very few limitations on what event types (customer actions) can be published (provided) to a marketing automation platform of the server 101. Website managers (such as website manager of merchant server 140) can implement their own events (sensed customer actions) that make sense for their business and simply send those events over to the marketing automation platform of the server 101.

Further, as will be described, implementations of the devices 204, 206 that include mobile devices can additionally or alternatively include additional types of sensed customer actions. Such sensed customer action can include sensing a physical customer visit and/or purchase. Further, such sensed customer action can include sensing a virtual customer visit and/or purchase online. That is, the sensing of the customer action can include sensing the customer visiting a physical location of the merchant, and/or the customer purchasing a product or service of the merchant at a physical store location of the merchant. Further, the sensed customer actions can include combinations or sequences of customer actions. For an embodiment, sensed customer actions are weighted based on the sensed customer actions. For an embodiment, only sensed customer actions having a weight, or a combination of weights that exceed a customer action threshold are considered a customer action for the purposes of detecting customer actions.

For an embodiment, the location monitoring of the mobile device of the customer is used to identify business locations visited by the recipient after receiving the short message(s) of the marketing message. Different businesses can be rated, wherein particular businesses yield a higher customer action score, and other particular businesses yield a lower engagement score. The customer action score of each business can be adaptively adjusted based on the electronic marketing message of the merchant and can be adjusted based on other businesses visited by the recipient. For an embodiment, patterns of location visits by the recipient can be used to influence the level of customer action.

For an embodiment, motion of the recipient is tracked by location and motion sensors 209 and can be used to influence the level of customer action. Certain actions (motions) of the recipient may indicate different levels of customer action. For an embodiment, the computing devices 204, 206 may include a mobile phone, a smart watch, or a headset. Motion of the recipient can include tracking hand motions, direction of eyesight, and/or orientations of the recipient. Accordingly, whether the recipient is in a physical location of a product of the merchant can be determined. Further, how long the recipient holds or looks at a specific product of the merchant can be determined. Further, whether the recipient interacts with another recipient can be determined. All the sensed/tracked locations and motions of the customer can be included within a score of the customer action. For example, visiting a restaurant after receiving a short message is a very possible use case since this is an in-person customer action. Again, a score that exceeds a score threshold can be deemed a customer action. The actions and locations of the customer can be tracked 207 allowing patterns in the customer behavior to be determined. As described, sequences of behaviors by the customer can be ranked for determining a score which is used for determining whether a customer action has occurred.

Further, for an embodiment, different businesses physically visited can be rated, wherein particular businesses yield a higher success score and other particular businesses yield a lower success score. The success score of each business can be adaptively adjusted based on marketing messages and can be adjusted based on other businesses visited by the customer. For an embodiment, patterns of location visits by the customer can be used to influence the level of success. That is, for example, visiting a location of a business can be rated higher or lower based on a previous business visited by the customer.

As previously described, the customer tracking can include monitoring of web browsing of the customer. Online action and activity of the customer can influence the success score. Links accessed by the customer can be tracked. Websites visited by the customer can be tracked. Online purchases of the customer can be tracked. Each of the online web browsing of the customer can influence the success score of the customer actions.

For an embodiment, eye tracking of a customer can be sensed and used to see how long a customer observes a short message (how engaging the message is), or, how long the customer has the short message open on their screen. These observed actions can further be used to rank a success of short messages sent to customer(s).

For an embodiment, relationships between different customers are determined. For example, web tracking can determine online relationships between customers. Further, for an embodiment, a real physical relationship between customers can be established by tracking the locations of the different customers. Two customers may be identified as friends or associates or living together based on location tracking. Further, commonalities of recipients can be determined by identifying common locations, or common types of locations between the different customers. The influence one customer has on another customer can be measured and the influence can add or subtract from the success score.

For an embodiment, a level of customer action can be adaptively adjusted for each customer based on actions of an associated customer. An action by a related or common type of customer can influence how much an action by a customer influences the engagement determination or influences a success determination.

As previously described, the success determination of the described customer actions can be scored, and a score exceeding a score threshold can qualify as a customer action which is tracked.

For an embodiment, a second discriminator model 272 assigns a second quality rating for each of the short messages displayed to the one or more customers based on the tracked customer actions. For an embodiment, the rankings of the customer actions influence the second quality rating of each of the short messages. For an embodiment, the second discriminator model 272 is trained on historically tracked customer actions on previously generated short messages, including opens of and clicks in electronic marketing messages with a certain short messages. With this training the model assigns a quality rating to new, previously unseen M short messages after they have been generated, allowing selection of the predicted top-performing short messages to display to the merchant.

At least some embodiments further include continuously updating the generative text engine model 152 based on continuously generated second quality ratings as determined by the second discriminator model 272.

For an embodiment, the discriminator model 132 and the second discriminator model 272 both simultaneously provide quality ratings of short messages for the generative text engine model 152. For an embodiment, discriminator models can be used together to create a conclusive quality rating by for example creating a weighted sum of the outputs of the two models. For an embodiment, one of the discriminator models has a greater influence on the quality rating than the other of the discriminator models. For example, when a quality rating of one of the discriminator models suggests a very high quality (greater than a predetermined threshold)

then that discriminator model provides the dominant quality rating. For example, the actions of the merchant user may indicate one short message to have a high quality. However, the customer action may indicate that one other short message is substantially (greater than the predetermined threshold). For an embodiment, the customer actions provide a better short message quality indication than the merchant actions. Accordingly, in this case, the second discriminator model 272 has a greater influence on the quality of the short message than the discriminator model 132.

For an embodiment, the discriminator 132 and the second discriminator 272 are combined to form a single discriminator model that is trained using data consisting of both merchant and customer actions.

FIG. 3 shows another system for automatic short messages generation for electronic messages of an electronic marketing message of a merchant, according to another embodiment. This embodiment further includes a filtering discriminator model 362 which operates to facilitate the reduction of the N messages down to the M messages. For an embodiment, the previously-described identified merchant actions are used to improve (train) the operation of filtering discriminator model 362. For an embodiment, the training adds style or branding of the merchant user per feedback as to messages that have higher scoring or ranking due to merchant actions, such as, clicks/conversions/etc. For an embodiment, this can be tailored to the merchant, the type of message, or the customer. For an embodiment, multiple messages can be A/B tested to determine the better performing message Further, messages may be directed to classify and suggest marketing tactics (that is, convey urgency, feel personal).

Figure 4:
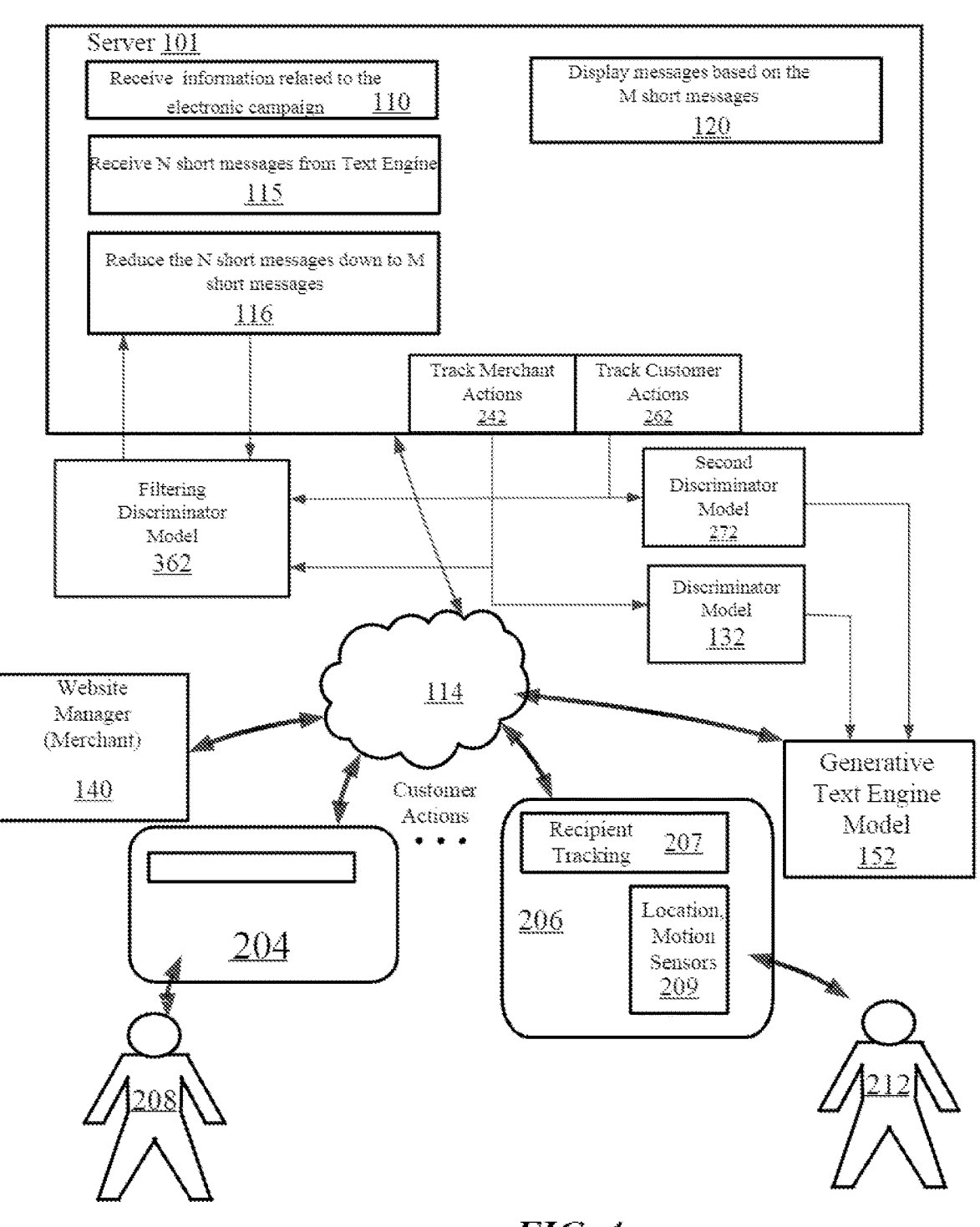
FIG. 4 shows another system for automatic short messages generation for electronic messages of an electronic marketing message of a merchant, according to another embodiment.

FIG. 4 shows another system for automatic short messages generation for electronic messages of an electronic marketing message of a merchant, according to another embodiment. For this embodiment, the previously described identified customer actions are used to improve (train) the operation of filtering discriminator model 362.

Figure 5:
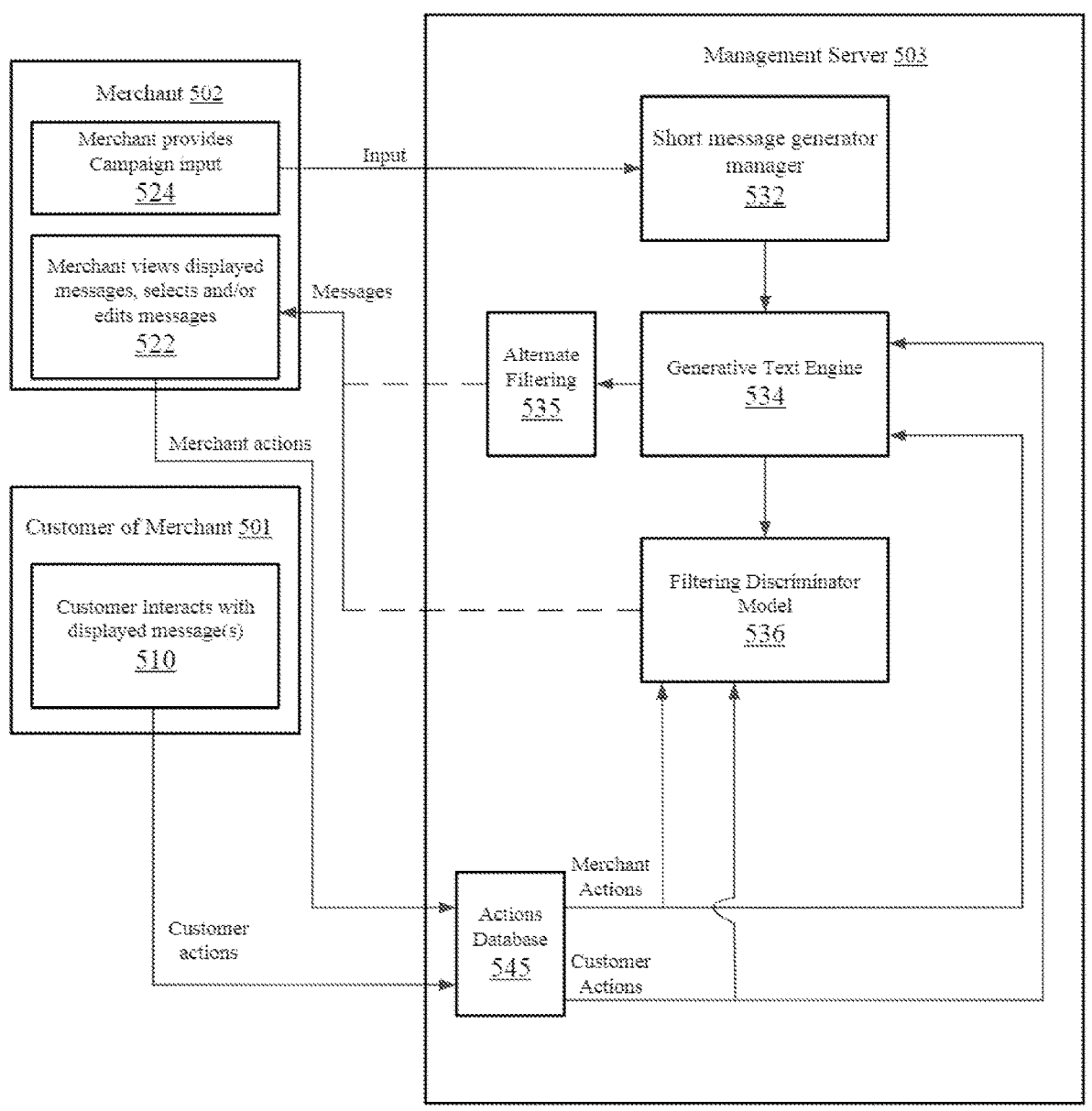
FIG. 5 shows another system for automatic short messages generation for electronic messages of an electronic marketing message of a merchant, according to another embodiment.

FIG. 5 shows another system for automatic short messages generation for electronic messages of an electronic marketing message of a merchant, according to another embodiment. As shown, for an embodiment, a merchant of a merchant server 502 may provide inputs 524 through, for example, an electronic marketing message. The inputs 524 may be additionally processed and then received by a short message generator manager 532 for input to a generative text engine 534. As previously described, the generative text engine 534 provides textual outputs based on the inputs from the merchant. For an embodiment, the inputs provide information about the short messages the merchant would like to generate, including, for example, a short description of the message the merchant wants to send, and a bit of metadata about an electronic campaign the merchant wants to launch. This information is fed into the generative text model. For an embodiment, the textual outputs are in the form of short messages that can be the basis for electronic messages of a marketing message of the merchant of the merchant server 502.

As previously described, for the embodiment, the management server 503 further operates to reduce an initial N short messages generated by the generative text engine 534 down to M short messages. For an embodiment, this includes filtering the short message based on predefined filtering criteria through, for example, an alternate filtering 535. For an embodiment, a filtering discriminator model 536 operates to reduce the number of short messages. While shown as separate filtering mechanisms, it is to be understood that the output of the alternate filtering 535 could be an input to the filtering discriminator model 536.

For an embodiment, after filtering the original N short messages down to the M short messages, the generated messages or messages based on the generated messages are displayed 522 to the merchant. The merchant views the displayed messages and can then select or edit the generated and displayed messages. For an embodiment, the monitored merchant actions are stored in an monitored actions database 545. Different actions by the merchant provide different levels of interest in the short messages, and accordingly, can influence a ranking of the quality of each of the displayed messages. For an embodiment, a discriminator model receives the merchant actions, ranks the short messages based on the monitored merchant actions, and provides quality ranking data of the generated short messages back to the generative text engine 534. Accordingly, the short messages generated by the generative text engine 534 will improve over time as more generated short messages are ranked and the quality of each of the generated messages is feedback to the generative text engine 534.

Additionally, for an embodiment, a customer 501 of the merchant 502 is provided with short messages that are based on the short messages provided to the merchant 502. The merchant may provide messages as received, or the merchant may modify the originally generated short messages. Either case, the short messages are displayed to the customer. For an embodiment, this includes sending a customer device an SMS message that includes the short message.

The customer may then act upon the receiving and displaying of the short message(s) 510. For an embodiment, the customer actions based on the displayed short message are monitored. For an embodiment, the customer actions are stored in the action database. For an embodiment, a second discriminator model generates a quality rating for each of the displayed short messages based on the previously described different customer actions. For an embodiment, the quality rating of each of the short messages is feedback to the generative text engine 534 to additionally influence the generation of short messages.

As previously described, for an embodiment, the filtering discriminator model 536 operates to reduce the number of short messages before the short messages are displayed to the merchant 502. For an embodiment, quality ratings of the merchant actions and/or customer actions are used to improve the filtering of the filtering discriminator model 536. That is, for example, the filtering of the short messages is performed such that the short messages having lower quality are filtered out before being displayed to the merchant 502 and/or the customer 501.

Figure 6:
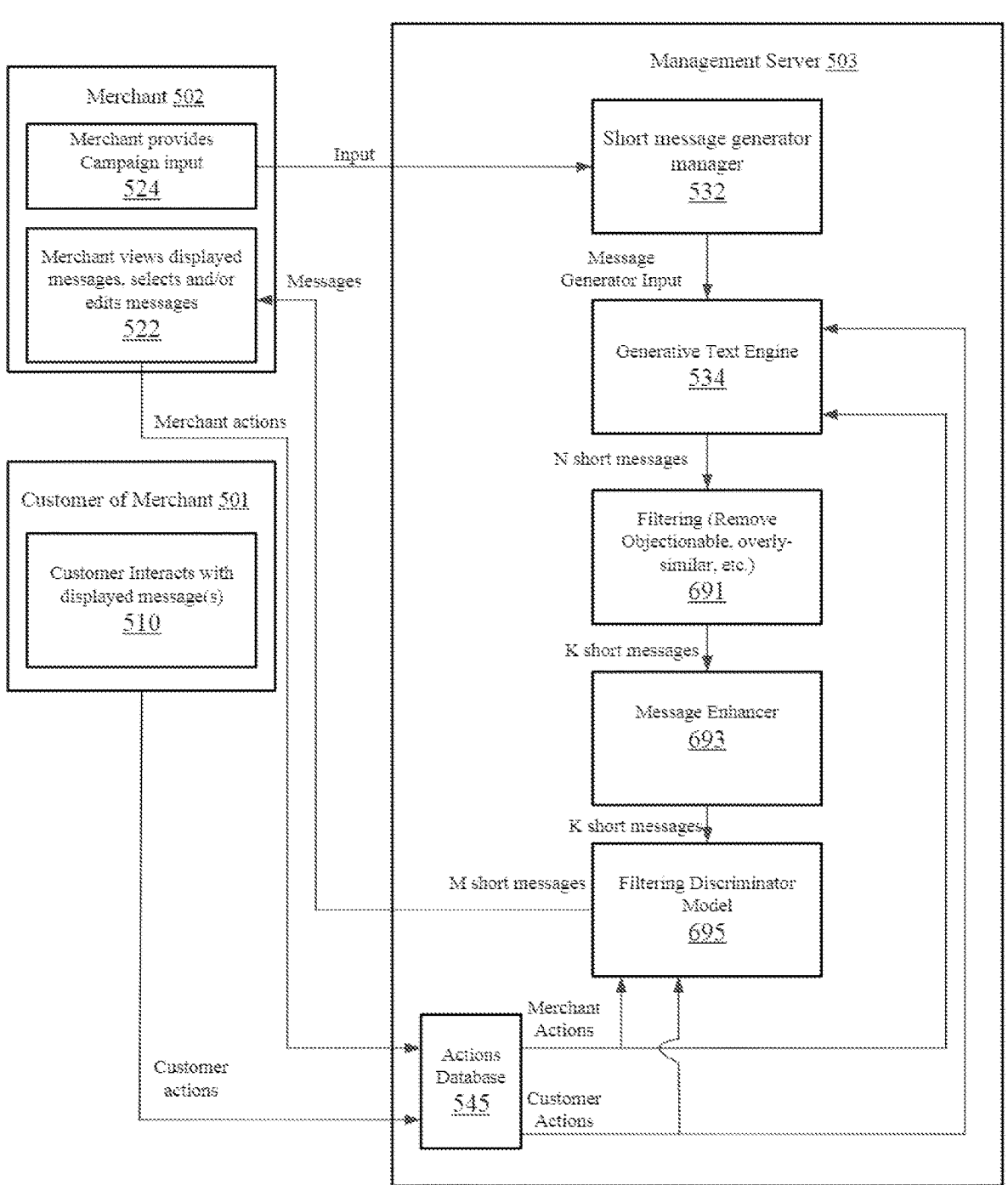
FIG. 6 shows another system for automatic short messages generation and message enhancement for electronic messages of an electronic marketing message of a merchant, according to another embodiment.

FIG. 6 shows another system for automatic short messages generation and message enhancement for electronic messages of an electronic marketing message of a merchant, according to another embodiment. This embodiment further includes content enhancement of one or more of the generated short messages. For an embodiment, this includes applying a message enhancer model 693 to enhance existing content for a selected one or more of the N or M short messages. For an embodiment, enhancing the content includes modifying or updating the existing content to include a branding voice of the merchant user. For the embodiment of FIG. 6, filtering 691 is applied to the N short messages generated by the generative text engine 534 which reduces the number of short messages to K short messages. This filtering can include removing short messages that include objectionable language, overly similar short messages, etc. For this embodiment, the K short messages are received by a content enhancer 693 which operates to enhance the content of the K short messages as described. Further, as shown, for an embodiment, the K messages are received by the filtering discriminator model 695 which filters the K short messages down to the M short messages. That is, the filtering of the original N short messages down to the M short messages is achieved by both the filtering 691 and the filtering discriminator model 695.

An alternate embodiment could include a generative text engine model that is uniquely able to account for brand style. That is, the content enhancing for branding is included within the generative text engine model.

For an embodiment, enhancing the content includes personalizing the content for the specific merchant users. For an embodiment, the branding voice of the merchant user is determined by analyzing previous or past samples of short messages or other content of the merchant user. For an embodiment, merchant users provide the server with a url of a storefront website of the merchant, so that the server can scrape certain parts of the website of the merchant and use this information to adapt the style of generated messages. An embodiment includes classifying companies (merchant users) as different things (for example, fun, serious, etc.), and then using the classifications to tag companies (merchant users) based on a communication style, in which the communication style is based on analysis done on prior communications (short messages and/or other communications by the merchant) sent by that merchant user. For an embodiment, the branding voice of the merchant user provides a high-level description of an overall communication style of a company (merchant). The branding voice can include a linguistic style, personality, use of emojis, punctuation, and/or common phrases to personalize the N short messages to mirror a specific brand tone of the merchant user.

For an embodiment, tracking the actions of the merchant includes tracking one or more short messages in their final form before being sent to customer(s). Differences between the final form and the form as suggested by the M short messages can be identified and used for future short message generation.

For an embodiment, enhancing the content includes controlling a message length, such as, shortening or lengthening a selected piece of the electronic messages. As previously described, for an embodiment, a merchant is provided with a slider control that allows the merchant to adaptively adjust the tone of the electronic messages. For example, the slider is displayed on a user interface to the merchant, wherein the merchant can adjust the slider control to adjust the tone. For example, the endpoints of the slider control may be serious and fun, and the merchant adjusts the slider control between the two endpoints to control the tone of the electronic messages between serious and fun. For an embodiment, enhancing the content includes providing the merchant with a toggle that allows the merchant to selectively match a brand voice of current electronic messages with a brand voice of past electronic messages.

For an embodiment, enhancing the existing content is based on collected information from short messages of past high-performing electronic marketing messages and adjusting content of the selected one or more of the M short messages to reflect a brand tone of the merchant user based on content and success of past high-performing electronic marketing messages and existing website content. For an embodiment, the brand tone includes a tone signature. That is, a mood the merchant user typically expresses in their electronic communications The mood can be mathematically expressed, for example, by determining whether the communications of the merchant user typically fall on a couple mood dimensions, such as, fun vs. serious, sincere vs. snarky, engaging vs. boring. The mood may alternatively or additionally be determined based on common emojis/phrases/keywords that often occur in messages of the merchant user. The mood may alternatively or additionally be determined based on message length, use of emojis, and other media (e.g. pictures, links).

For an embodiment, as previously described, the brand tone or mood of a merchant user can be determined by evaluating a sample of a copy of the merchant user. For an embodiment, a tone of a merchant is estimated based on evaluating past messages of the merchant and selecting which previous messages to copy tone from based on the performance of the previous message when sent to customers of the merchant user. Common tactics include determining whether the previous messages evoke curiosity, convey urgency, and/or create rapport with the customers of the merchant user.

FIG. 7 is a flow chart that includes steps of a method for automatic short messages generation for electronic messages of an electronic marketing message of a merchant, according to another embodiment. A first step 710 includes receiving, by a server, information related to the electronic marketing message. A second step 720 includes receiving, by the server, a plurality of N short messages generated based on the received information from a generative text engine model. The generative text engine may be a third party engine, a third part engine supplemented by the server, or any other possible text engine. A third step 730 includes reducing, by the server, the plurality of N short messages down to M short messages. A fourth step 740 includes displaying messages based on the M short messages to a merchant user. This can include displaying the M messages or messages inspired or based on the M short messages. A fifth step 750 includes identifying merchant actions in response to the displaying of the messages based on the M short messages. For an embodiment, the merchant action includes both proactive actions by the merchant, and/or actions not take by the merchant. For example, an action can include the merchant not clicking or selecting a link. An embodiment additionally includes sensing actions of customers of the merchant. A sixth step 760 includes fine-tuning, by the server, the generative text engine model based on the identified merchant actions.

For an embodiment, the server is electronically connected to a merchant server of the merchant user, and electronically connected to a plurality of customer devices of customers of the merchant user. An embodiment further includes displaying at least a portion of the messages based on the M short messages to one or more customers of the merchant user, identifying customer actions in response to the displaying of the at least the portion of the messages based on the messages M short messages, and further fine-tuning, by the server, the generative text engine model based on the sensed customer actions.

For an embodiment, a filtering discriminator model performs at least a portion of the reduction of the plurality of N short messages down to the M short messages. An embodiment includes fine-tuning, by the server, the filtering discriminator model based on the identified merchant actions. An embodiment includes fine-tuning, by the server, the filtering discriminator model additionally based on sensed customer actions.

For an embodiment, identifying merchant actions includes tracking, by the server, actions of the merchant user at the merchant server based on the messages based on the M short messages displayed. Further, for an embodiment, fine-tuning the generative text engine model includes assigning a quality rating to at least a portion of the messages based on the M short messages, and supplementing data used to train the generative text engine model with quality ratings of the at least the portion of the messages based on the M short messages. At least some embodiment, further include continuously updating the generative text engine model based on continuously generated quality ratings. For an embodiment, tracking the merchant actions includes sensing selections by the merchant user of one or more of the short messages displayed to the merchant user.

For an embodiment, tuning the generative text engine model includes assigning a second quality rating for each of the short messages displayed to the one or more customers based on the tracked customer actions, and supplementing data used to train the generative text engine model with the second quality ratings of the short messages displayed to the one or more customers. For an embodiment, tracking the customer actions includes at least some of the previously described embodiments for sensing the customer actions at the customer devices. For an embodiment, sensing the customer actions includes sensing online action of the one or more customers. For an embodiment, sensing the customer actions includes sensing physical motion of the customer devices of the one or more customers. At least some embodiments further include continuously updating the generative text engine model based on continuously generated second quality ratings.

For an embodiment, reducing the plurality of N short messages down to M short messages includes generating similarity scores between each of the N short messages and eliminating one or more short messages based on a similarity with one or more other short messages. For an embodiment, generating similarity scores between each of the N short messages and eliminating one or more short messages based on a similarity with one or more other short messages comprises prioritizing diversity across displayed short messages based on pairwise similarity scores.

For an embodiment, reducing the N short messages down to M short messages includes generating similarity scores between each of the N short messages and the received information and eliminating one or more short messages based on a similarity with the received information. For at least some embodiments, the creativity is encouraged, but the intent of the merchant is still reflected as far as business details are concerned. For an embodiment, the information provided to fine tuning the generative text engine does not include fake business details.

For an embodiment, reducing the N short messages down to M short messages, further comprises eliminating short messages that have greater than an upper character threshold number of characters or less than a lower character threshold number. Small message systems can include both a lower and upper bound on the number of characters.

For an embodiment, filtering the N short message to eliminate short messages includes filtering the N short message to eliminate short messages based on content, including eliminating short messages that include inappropriate and politically sensitive words.

For an embodiment, filtering the N short message to eliminate short messages includes filtering the N short message to eliminate short messages based on content, including eliminating short messages that include identified prohibited context. The prohibited context can be selected or identified by an operator of the server, by the merchant user, or by public policy. This can include specific words or intended meanings.

An embodiment further includes applying a fine-tuned enhancer model to enhance existing content for a selected one or more of the M short messages, wherein enhancing the content includes modifying or updating the existing content to include a branding voice of the merchant user. For an embodiment, this includes personalizing the content for the merchant users. That is, personalizing the content for the specific merchant user. For an embodiment, the branding voice of the merchant user is determined by analyzing previous or past samples of short messages of the merchant user. An embodiment includes classifying companies (merchant users) as different things (for example, fun, serious, etc.), and then using the classifications to tag companies (merchant users) based on a communication style, in which the communication style is based on analysis done on prior communications (short messages) sent by that merchant user. For an embodiment, the branding voice of the merchant user provides a high-level description of an overall communication style of a company (merchant). The branding voice can include a linguistic style, personality, use of emojis, punctuation, and/or common phrases to personalize the N short messages to mirror companies' specific brand tone. This can include matching prior communication styles of the company (merchant user).

For an embodiment, previously short messages sent by the merchant user that performed well (caused customers of the merchant to perform an action) or that are determined to match the branding voice of the merchant user are provided to the generative text engine model for the generation of short messages. That is, personalized short messages are generated by the generative text engine model by analysis of prior short messages sent by the merchant user.

Reducing the Number of Short Messages

For an embodiment, reducing the number of short messages includes filtering the N short messages to eliminate short messages based on content. For an embodiment, content of short messages that includes inappropriate and/or sensitive words are filtered out. That is, for an embodiment, short messages that include the questionable content are eliminated.

For an embodiment, short messages having greater than a character threshold number of characters are reduced or eliminated. For example, for an embodiment, the server 101 performs checks on the number of characters in the short messages and only allows, for example, one short message above 50 characters. If all the short messages fail the character threshold number, then a new set of short messages are generated.

For an embodiment, the post processing (processing of the short messages after generation by the text engine model 152) further includes fixing short messages with capitalization issues. For example, a generating short message might include "you'll love our sale" which may be fixed to "You'll love our sale". This additionally can be applied to short messages enclosed in extraneous punctuation marks.

For an embodiment, reducing the number of short messages includes generating similarity scores between each of the N short messages and eliminating one or more short messages based on a similarity with one or more other short messages. That is, it can be desirable for each of the short messages to be diverse relative to the other short messages. Accordingly, a similarity score can be used to eliminate short messages that are relatively similar compared to other of the short messages. Note that it is possible to eliminate all but one unique short message.

For an embodiment, cosine similarity scores are computed between short messages using established vectorization methods. Namely, for an embodiment, the short messages are embedded as vectors, and the projection of the two vectors on one another quantifies the syntactic similarities between the two short messages. For an embodiment, when short message pairs are determined to have high similarity scores, only one short message of the pair is kept of the two short messages. For an embodiment, the threshold is determined experimentally to determine what threshold of similarity works well. For an embodiment, a same similarity algorithm is run to compute pairwise similarity between each of the short messages and the merchant-provided description, ensuring sufficient short message difference from merchant inputs.

For an embodiment, similarity scores are generated between text strings of short messages. For an embodiment, the similarity score is used to ensure the messages shown to the merchant user are sufficiently differentiated. For an embodiment, the scores include pairwise similarity scores.

For an embodiment, the cosine similarity process includes taking two text strings and embedding them as vectors, meaning that the words of the text string are translated into a mathematical object that includes numbers that can be processed. For example, "My name is Josh" may be embedded as [1, 1, 1, 1, 0, 0] and "My name is John Smith" may be embedded as [1, 1, 1, 0, 1, 1]. The "cosine similarity" between these two vectors is the "distance" spanned by these two vectors, the shorter this distance, the more similar are the strings. For an embodiment, the cosine similarity threshold is selected to be ~0.8, meaning if the cosine similarity calculated is approximately >0.8, the strings are too similar and one of the strings is eliminated and not show both to the user (merchant or customer).

As previously stated, it can be desirable to include diversity across the short messages. For an embodiment, short messages are maintained based on pairwise similarity scores. For an embodiment, if two short messages are within a threshold of similarity, and therefore, highly similar, one of the short messages is excluded to avoid a case of users (merchants) being presented with a narrow range of options to choose from.

For at least some embodiments, the cosine similarity scoring is applied to not just between short messages, but also between short messages and the merchant providing description (text). That is, for example, it is undesirable for a merchant to ask for short messages for a "Memorial Day Sale", and for the short message generator to then provide the short message "Memorial Day Sale" or "Memorial Day Sale!" or something similar. For at least some embodiments, the similarity threshold used for determining that similarity between short messages is different than the similarity threshold used for determining the similarity threshold between short messages and the merchant provided description. Both of the similarity thresholds can be experimentally determined. Further, they can be adaptive from one merchant to the other.

At least some embodiments encourage some kinds of details but discourage others. For example, it may be desirable to discourage making up things that are relevant to the business (that is, don't make up a discount code or specific offer if the user didn't put that in), but encourage adding more personality, product description copy, interesting formats, etc.

For an embodiment, if the described methods of reducing the number of short messages results in less than a threshold number of short messages, the server 101 operates to resend a request for information (additional short messages) from the generative text engine model 152.

Fine-Tuned Enhancer Model(s) for Enhancement

For at least some embodiments, a fine-tuned enhancer model 132 can be applied (118) to enhance existing content for a selected one or more of the M short messages. That is, the remaining M short messages are enhanced by the fine-tuned enhancer model 132 by adding content. For an embodiment, applying (118) the fine-tuned enhancer model 132 to enhance existing content includes adding emojis to the selected one or more of the M short messages. For an embodiment, the inclusion of emojis, for instance, is determined by training an enhancement model on historical short message-emoji pairs, gathering an emoji selection by calling the enhancement model on a short message, and appending the emojis to the short message according to predetermined patterns. For an embodiment, the emoji could go anywhere and not only be appended according to predetermined patterns.

For at least some embodiments, applying the fine-tuned enhancer model 132 to enhance existing content includes adding information to enhance the selected one or more of the M short messages. For an embodiment, the process for selecting and adding the enhancements includes identifying the nature of the content presented in the short message and appending relevant emojis based on the content, allowing merchant users the ability to automatically adjust the tone of the short messages based on their brand tone and adding best practice keywords to improve the success rate of the short messages. For an embodiment, adding enhancements includes altering one or more keywords of the short message(s). For example, adding enhancement could include highlighting that merchant users should be using the word "Offer" instead of "Discount" based on previously collected data on what works best for end-recipients (for example, customers).

For at least some embodiments, the fine-tuned enhancer model 132 is applied to a randomly selected one or more of the M short messages. For an embodiment, one of the M short messages that make it through the post processing check is selected with equal probability for adding additional subject matter. A random selection for post process checking can be advantageous because there is no bias in short message selection. However, at least some embodiments include at least some intelligence in the short message selection for enhancement. For an embodiment, it may be clear that an enhancement would improve one short message but not others, and therefore, in this case only that short message would be selected, and not the other short messages.

At least some embodiments include multiple fine-tuned enhancer models. For example, one fine-tuned enhancer model may be applied to short messages, and another for short message enhancement, such as, emojis.

Although specific embodiments have been described and illustrated, the embodiments are not to be limited to the specific forms or arrangements of parts so described and illustrated. The described embodiments are to only be limited by the claims.

What is claimed:

1. A computer-implemented method for generating text for short messages for electronic marketing messaging, comprising:

receiving, by a server, information related to the electronic marketing message;

receiving, by the server, a plurality of N short messages generated based on the received information from a generative text engine model;

reducing, by the server, the plurality of N short messages down to M short messages comprising:

determining similarity scores between each of the N short messages eliminating one of any two short messages of the N short messages that are determined to have a similarity score greater than a first similarity threshold;

determining similarity scores between each of the N short messages and the received information;

eliminating short messages of the N short messages that are determined to have a similarity score greater than a second similarity threshold with the received information;

wherein the first similarity threshold is different than the second similarity threshold;

displaying messages based on the M short messages to a merchant user;

identifying merchant actions in response to the displaying of the messages based on the M short messages, comprising tracking, by the server, actions of the merchant user at a merchant server based on the messages displayed; and fine-tuning, by the server, the generative text engine model based on the identified merchant actions, comprising:

assigning a quality rating to at least a portion of the messages based on the M short messages; and supplementing data used to train the generative text engine model with quality ratings of the at least the portion of the messages based on the M short messages.

2. The method of claim 1, wherein the server is electronically connected to a merchant server of the merchant user, and electronically connected to a plurality of customer devices of customers of the merchant user, and further comprising:

displaying at least a portion of the messages based on the M short messages to one or more customers of the merchant user;

identifying customer actions in response to the displaying of the at least the portion of the messages based on the M short messages; and further fine-tuning, by the server, the generative text engine model based on the identified customer actions.

3. The method of claim 2, wherein tuning the generative text engine model comprises:

assigning a second quality rating for each of the short messages displayed to the one or more customers based on the identified customer actions; and supplementing data used to train the generative text engine model with the second quality ratings of the short messages displayed to the one or more customers.

4. The method of claim 2, wherein a filtering discriminator model performs at least a portion of the reducing of the N short messages down to the M short messages, and further comprising fine-tuning, by the server, the filtering discriminator model based on the identified customer actions.

5. The method of claim 2, wherein identifying the customer actions in response to the displaying of the at least the portion of the messages based on the M short messages comprises:

sensing the one or more customers visiting a physical location of the merchant, and the one or more customers purchasing a product or service of the merchant at the physical store location of the merchant.

6. The method of claim 2, wherein identifying the customer actions in response to the displaying of the at least the portion of the messages based on the M short messages comprises:

sensing combinations or sequences of customer actions; and weighting the sensed customer actions based on the sensed customer actions; and identifying a customer action for combinations of weighted customer actions exceeding a customer action threshold.

7. The method of claim 2, wherein identifying the customer actions in response to the displaying of the at least the portion of the messages based on the M short messages comprises:

identifying business locations visited by customers after receiving short messages;

rating different businesses with different customer action scores; and identifying a customer action based on the ratings of the different businesses visited by the customers.

8. The method of claim 2, wherein identifying the customer actions in response to the displaying of the at least the portion of the messages based on the M short messages comprising:

tracking, by location and motion sensors of computing devices of the customers, locations and motions of the customers including tracking hand motions, direction of eyesight, and orientations of the customers;

identifying motions of a customer including how long the customer holds or looks at a specific product of the merchant;

determining a score of sensed customer actions based on sensed locations and motions of the customer; and identifying a customer action based on the score.

9. The method of claim 2, wherein identifying the customer actions in response to the displaying of the at least the portion of the messages based on the M short messages comprises:

determining relationships between different customers by tracking locations of the different customers;

identifying customer friends or associates of the different customers based on location the tracking;

identifying commonalities of the different customers by identifying common locations, or common types of locations between the different customers; and determining a success score of the M short messages based on a level of influence between the different customers.

10. The method of claim 1, wherein a filtering discriminator model performs at least a portion of the reducing of the plurality of N short messages down to the M short messages.

11. The method of claim 10, further comprising fine-tuning, by the server, the filtering discriminator model based on the identified merchant actions.

12. The method of claim 1, further comprising continuously updating the generative text engine model based on continuously generated quality ratings.

13. The method of claim 1, wherein reducing the plurality of N short messages down to M short messages comprises filtering the N short message to eliminate short messages based on content, including eliminating short messages that include inappropriate and politically sensitive words.

14. The method of claim 1, wherein reducing the plurality of N short messages down to M short messages comprises filtering the N short message to eliminate short messages based on content, including eliminating short messages that include identified prohibited context.

15. The method of claim 1, further comprising applying a fine-tuned enhancer model to enhance existing content for a selected one or more of the M short messages, wherein enhancing the content includes modifying or updating the existing content to include a branding voice of the merchant user, comprising personalizing the content for the merchant user to include the branding voice of the merchant user as determined by analyzing previous or past samples of short messages of the merchant user, and wherein enhancing further includes adding emojis to the selected one or more of the M short messages comprising:

determining by training an enhancement model on historical short message-emoji pairs;

gathering an emoji selection by calling the enhancement model on the selected one or more of the M short messages; and selected one or more of the M short messages according to predetermined patterns.

16. The method of claim 15, wherein personalizing the content for the merchant user includes personalizing the information related to the electronic marketing message before generating the N short messages, or personalizing content of the generated N short messages.

17. The method of claim 1, further comprising:

providing a merchant with a slider control that allows the merchant to adaptively adjust a tone of the M or N short messages comprising displaying the slider control on a user interface of the merchant allowing the merchant to adjust the tone of the M or N short messages, wherein endpoints of the slider include serious and fun.

18. The method of claim 1, further comprising applying a fine-tuned enhancer model to enhance existing content for a selected one or more of the M short messages, wherein enhancing the content includes modifying or updating the existing content to include a branding voice of the merchant user, comprising:

providing the merchant with a toggle that allows the merchant to selectively match a brand voice of current M or N short messages with a brand voice of past electronic messages.

* * * * *